(12) United States Patent
Bigolin

(10) Patent No.: US 7,407,225 B2
(45) Date of Patent: Aug. 5, 2008

(54) SADDLE INCLUDING A DEVICE FOR COUPLING SAID SADDLE TO A BICYCLE AND THE LIKE

(75) Inventor: Riccardo Bigolin, Vicenza (IT)

(73) Assignee: Selle Italia S.r.l., Vicenza (IT)

( * ) Notice: Subject to any disclaimer, the term of this patent is extended or adjusted under 35 U.S.C. 154(b) by 0 days.

(21) Appl. No.: 11/545,696

(22) Filed: Oct. 10, 2006

(65) Prior Publication Data

US 2007/0182225 A1   Aug. 9, 2007

(30) Foreign Application Priority Data

Feb. 6, 2006   (IT)   .......................... MI2006A0196

(51) Int. Cl.
*B62J 1/00* (2006.01)
*B62J 1/08* (2006.01)

(52) U.S. Cl. ............................... 297/215.14; 248/298.1

(58) Field of Classification Search ............ 297/215.13, 297/215.14, 215.15; 248/298.1
See application file for complete search history.

(56) References Cited

U.S. PATENT DOCUMENTS

| | | | | |
|---|---|---|---|---|
| 163,909 A | * | 6/1875 | Balcom | .................... 248/298.1 |
| 572,273 A | * | 12/1896 | Peterson | ................ 297/215.14 |
| 650,941 A | * | 6/1900 | Kramer | ....................... 280/283 |
| 1,050,235 A | * | 1/1913 | Scanlan | ............... 248/298.1 X |
| 1,050,395 A | * | 1/1913 | Schleicher | ............... 248/298.1 |
| 1,602,261 A | * | 10/1926 | Hill | .......................... 248/298.1 |
| 3,377,084 A | * | 4/1968 | Musichuk | ............... 297/215.14 |
| 3,603,609 A | * | 9/1971 | Hott et al. | ........... 297/215.14 X |
| 3,826,459 A | * | 7/1974 | Warren | ................ 248/298.1 X |
| 4,108,462 A | * | 8/1978 | Martin | ............... 297/215.14 X |
| 4,711,538 A | * | 12/1987 | Ohs et al. | ............. 248/298.1 X |
| 4,730,913 A | * | 3/1988 | Boothe | ................ 248/298.1 X |
| 4,753,410 A | * | 6/1988 | Dyer | .................... 248/298.1 X |
| 4,772,069 A | * | 9/1988 | Szymski | ................... 297/215.14 |
| 5,149,034 A | * | 9/1992 | Ganaja | ............... 297/215.14 X |
| 5,364,160 A | * | 11/1994 | Fritschen et al. | .... 297/215.14 X |
| 5,513,895 A | * | 5/1996 | Olson et al. | ............ 297/215.14 |
| 5,709,430 A | * | 1/1998 | Peters | ................ 297/215.14 X |
| 5,921,624 A | * | 7/1999 | Wu | ........................ 297/215.14 |
| 6,752,453 B1 | * | 6/2004 | Yapp | ..................... 297/215.14 |
| 6,827,397 B1 | * | 12/2004 | Driver | ................... 297/215.14 |

* cited by examiner

*Primary Examiner*—Rodney B. White
(74) *Attorney, Agent, or Firm*—James V. Costigan; Hedman & Costigan, P.C.

(57) ABSTRACT

An improved saddle for bicycles includes a device for coupling the saddle to a saddle sleeve to be coupled to the bicycle framework and comprising a saddle frame, defining an elongated central body, having an open slot, lying in a plane substantially perpendicular to the saddle sleeve, the central body being encompassed by an open bushing engageable with the arms of a fork coupled to the saddle sleeve, the bushing being adapted to be clamped by a locking pin passing through the open slot.

4 Claims, 4 Drawing Sheets

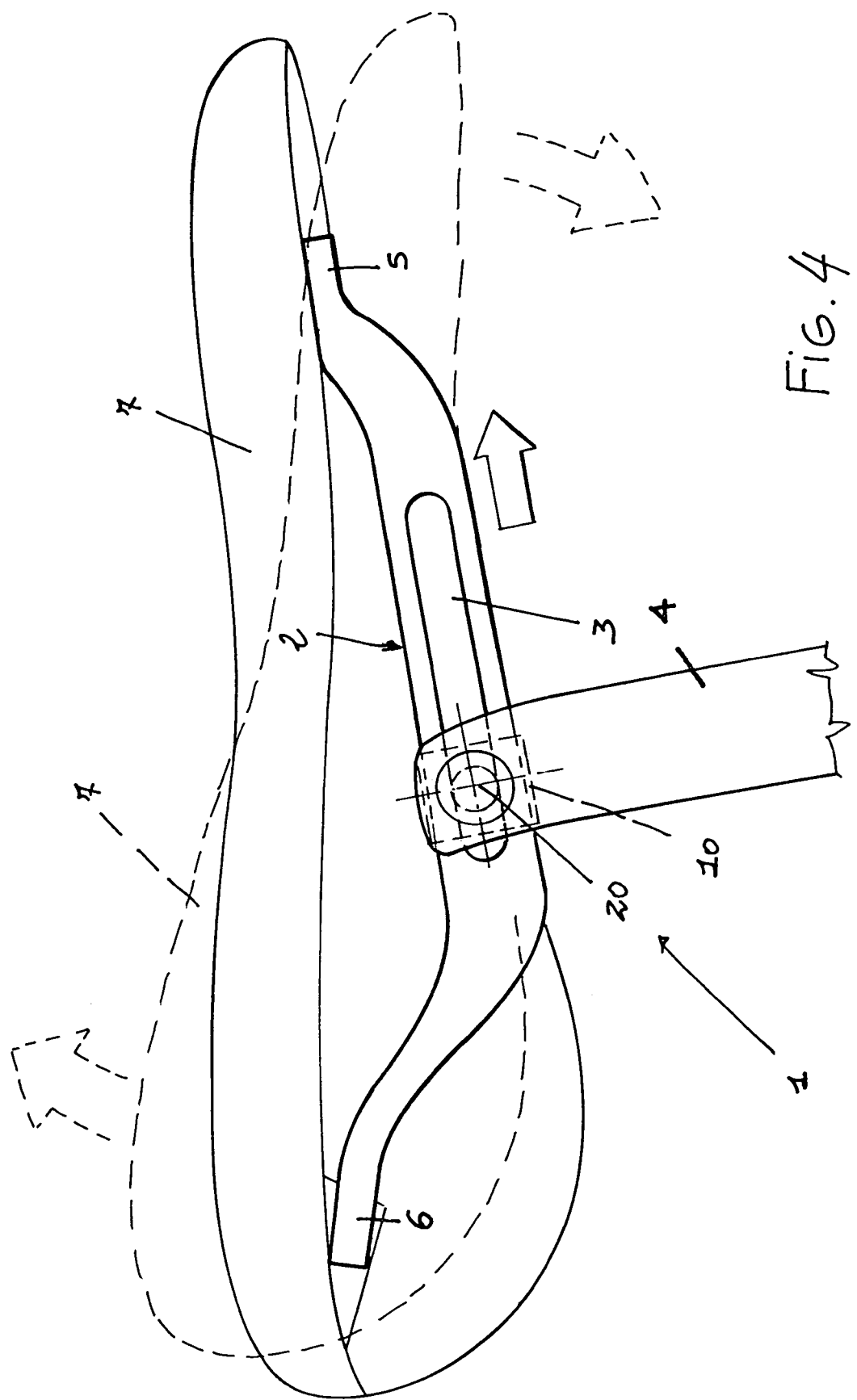

SADDLE INCLUDING A DEVICE FOR COUPLING SAID SADDLE TO A BICYCLE AND THE LIKE

BACKGROUND OF THE INVENTION

The present invention relates to an improved saddle including a coupling device for coupling said saddle to a cycle, bicycle and the like.

As is known, bicycle saddle are conventionally coupled to a sleeve element for clamping the saddle to the bicycle frame, through a coupling device so designed as to allow the saddle to be slanted with respect to a horizontal axis and to be longitudinally arranged with respect to the bicycle framework, i.e. designed for allowing the saddle to be moved toward/away with respect to the bicycle handlebar.

Prior saddle coupling device are so arranged as to provide a saddle swinging axis arranged under the region clamping the saddle to the bicycle frame.

Thus, owing to this arrangement, it is necessary to perform very complex adjustment operations, since a variation of the saddle inclination also causes a displacement of the saddle in the longitudinal direction, since the rotary pivot pin is arranged under the saddle frame or body.

Another problem is that prior solutions further require very complex adjusting operations and, in many cases, several clamping steps for properly clamping and arranging the saddle.

SUMMARY OF THE INVENTION

Accordingly, the aim of the present invention is to overcome the above mentioned drawbacks, by providing an improved bicycle saddle including a coupling device for coupling said saddle to a saddle supporting bicycle framework sleeve, allowing to easily adjust the slanting and longitudinal arrangement of the saddle frame or body by a single operation, without the need of performing adjustment operations.

Within the scope of the above mentioned aim, a main object of the invention is to provide such a coupling device for coupling a bicycle saddle to a saddle supporting sleeve allowing to use saddle frames or bodies made of composite fibers, having a comparatively high mechanical strength, jointly with a good overall elasticity thereby facilitating the cyclist comfort.

Another object of the present invention is to provide such a coupling device which, is very reliable and safe in operation.

Yet another object of the present invention is to provide such a coupling device which has a small weight, and may be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by an improved saddle including a framework coupling device for coupling said saddle to a bicycle sleeve, characterized in that said saddle comprises a saddle frame having an elongated central body and defining an open slot lying in a plane substantially perpendicular to the sleeve, an open bushing encompassing said body and engaging with the arms of a fork coupled to said sleeve, said bush being adapted to be clamped by a locking pin passing through said slot, being moreover provided.

BRIEF DESCRIPTION OF THE DRAWINGS

Further characteristics and advantages of the present invention will become more apparent hereinafter from the following detailed disclosure of a preferred, though not exclusive, embodiment of the improved bicycle saddle according to the invention, which comprises a coupling device for adjusting and coupling the saddle to a saddle supporting sleeve to be coupled to the bicycle framework (not shown) and, which is illustrated, by way of an indicative but not limitative example, in the accompanying drawings, where:

FIG. 4 is a further elevation view showing different positions of the saddle.

DESCRIPTION OF THE PREFERRED EMBODIMENT

Figure 1:
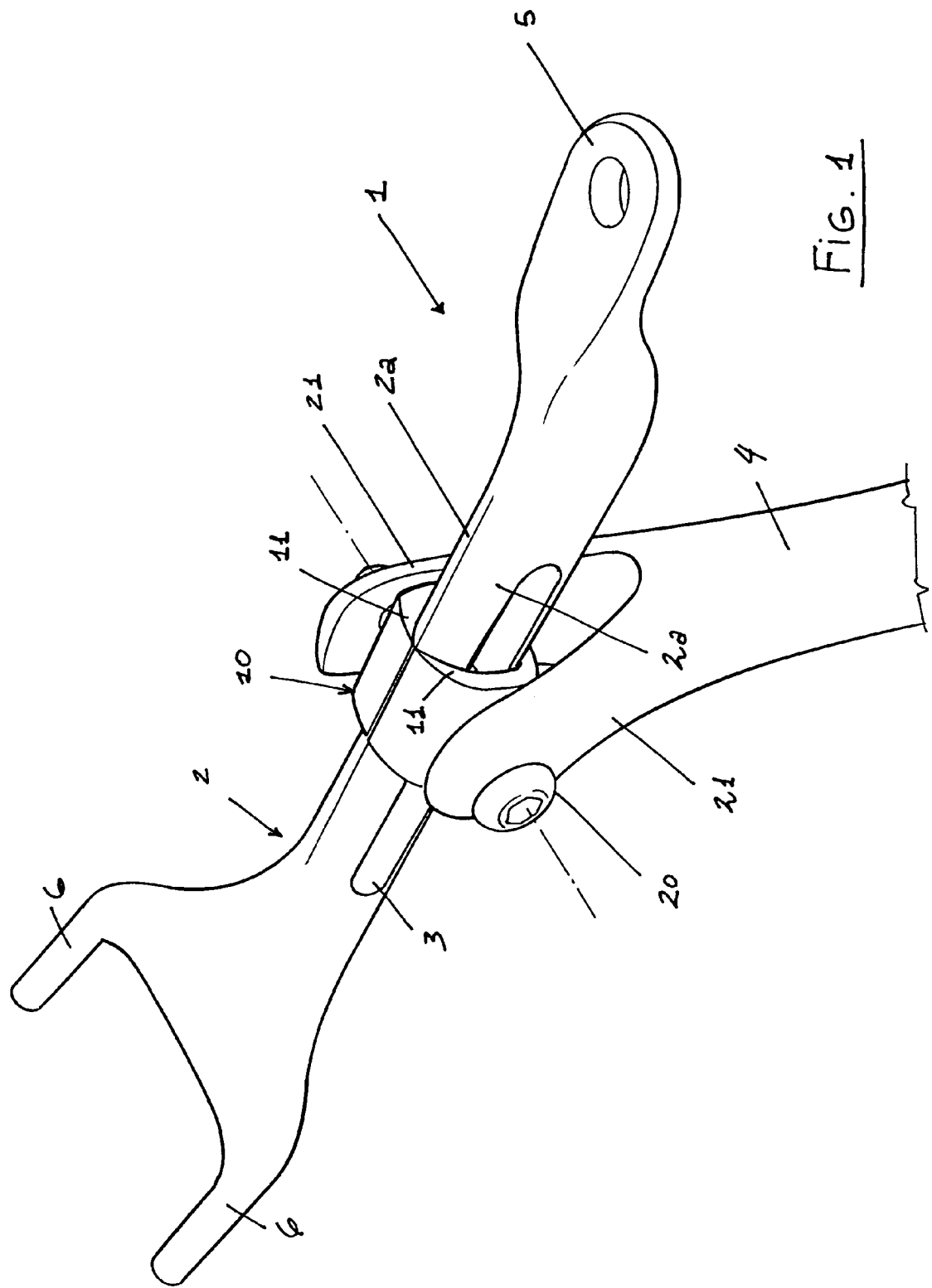
FIG. 1 is a schematic perspective top view showing the saddle and including a coupling device for coupling and adjusting the saddle, according to the invention.
Figure 2:
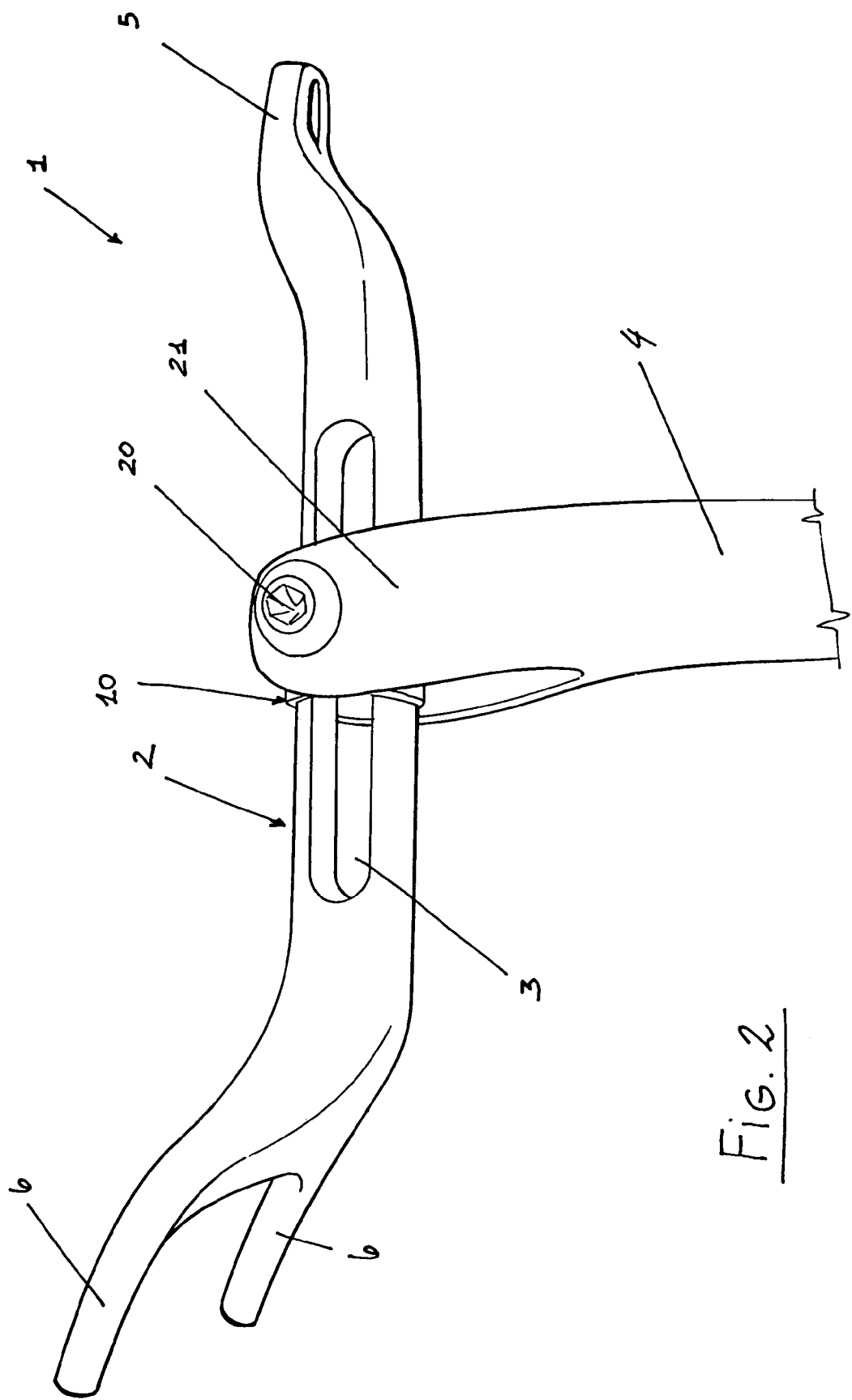
FIG. 2 is a bottom perspective view showing the coupling device.
Figure 3:
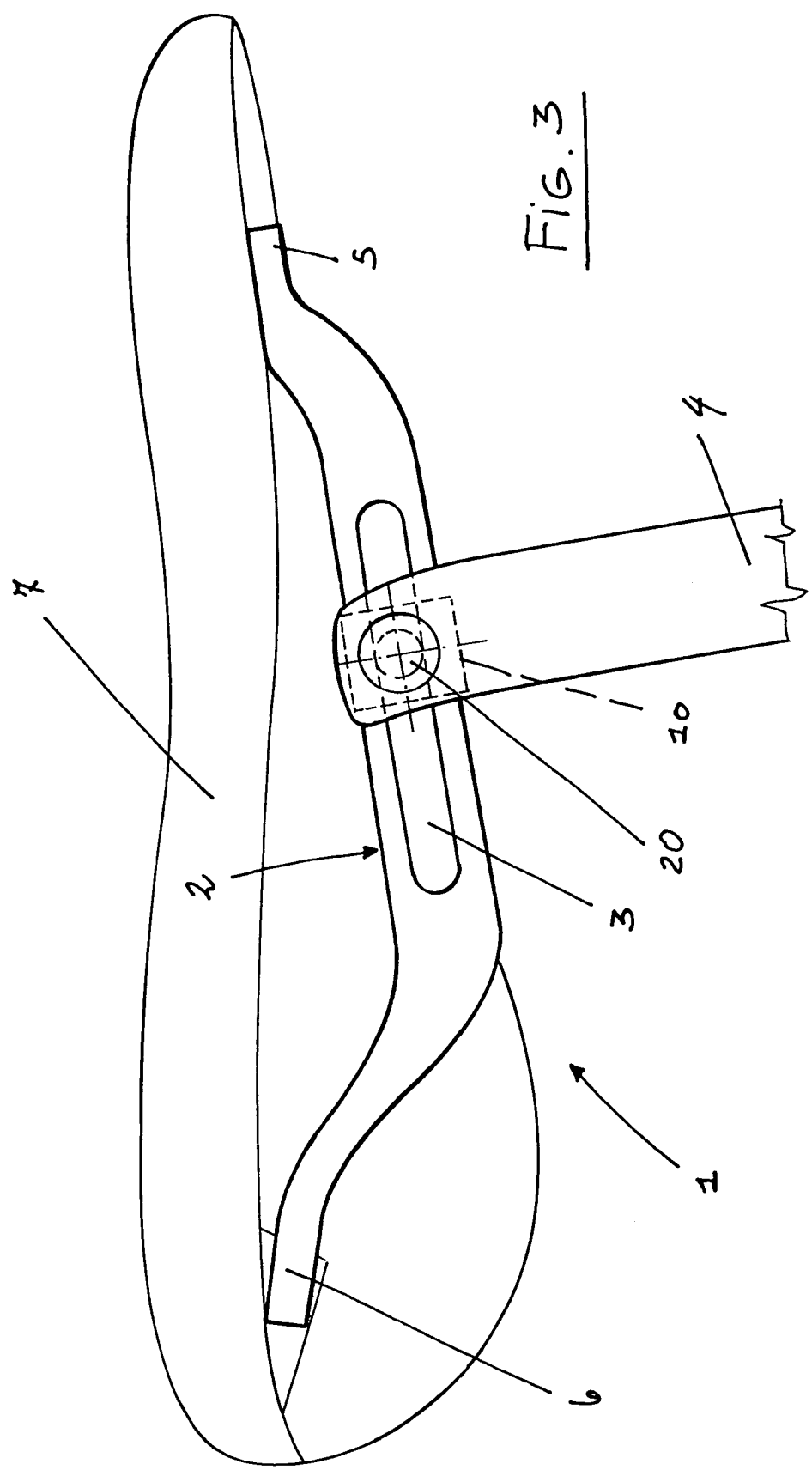
FIG. 3 is a schematic side elevation view showing the coupling and adjusting device coupled to the saddle.

With reference to the number references of the above mentioned figures, the improved saddle according to the present invention, including a coupling and adjusting device for coupling said saddle to a supporting sleeve to be coupled to the bicycle, framework comprises a frame, generally indicated by the reference number 1, which is advantageously made of a composite material and includes a central body 2, having an elongated shape with an open slot 3, extending through the overall length of the central body and lying on a plane substantially perpendicular to the sleeve 4, that is in a substantially horizontal plane.

The central body 2 is made of a composite material, preferably constituted by a plastics material reinforced by carbon fibers, and defines, at a tip portion 5 thereof, a coupling tip 5 and, at the rear thereof, two strut elements 6 which can be coupled, in a per se known manner, in the body 7 of a bicycle saddle, which may have any desired saddle construction.

The device comprises an open bushing, generally indicated by the reference number 10, encompassing the central body and including jaw elements 11 lying on opposite slanted planes corresponding to the slanted planes 2a defined on the central body 2.

To clamp the frame 1, a locking pin 20 is provided, engaging with the arms of a fork 21 arranged at the end portions of the sleeve 4, and housing therein said open bushing 10.

Thus, by operating the locking pin 20, it is possible to clamp the bushing 10 to lock it on the central body, owing to the provision of the slanted jaw elements 11 and of slanted planes 2a.

Thus, by the disclosed device, the central body 2 of the frame 1 can be longitudinally displaced, by changing the position of the pin 20 in the slot 3.

Moreover, the central body 2 can rotate about the pivot pin 20 since the bushing 10 can be clamped in the fork 21 performing the locking operation.

To that end, are moreover provided, on the mutual engagement surfaces, conventional grooves, allowing to provide a very firm locking.

By the disclosed device, the pivot pin forming the rotary axis for changing the inclination of the saddle directly passes through the frame 1.

Thus, it is very simple to adjust the longitudinal position and inclination of the saddle.

Moreover, the provision of the open slot 3, in addition to providing a broad position range in the longitudinal direction of the central body 2, allows to provide a small weight saddle while providing the saddle frame with very good resilient properties, thereby greatly increasing the user comfort.

From the above disclosure it should be apparent that the invention fully achieves the intended objects.

In fact, the invention provides a bicycle saddle including a specifically designed coupling device for coupling the saddle to its supporting sleeve, the device exploiting a novel coupling idea for coupling the frame to the locking element, including a pin directly passing through the mentioned slot and allowing the saddle to be easily longitudinally adjusted.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. An improved saddle including a coupling device for coupling said saddle to a bicycle frame, a sleeve adapted to be coupled to a bicycle framework, said saddle comprising a saddle frame having an elongated central body and defining an open slot lying in a plane substantially perpendicular to said sleeve, said central body being encompassed by an open bushing engaging with arm portions of a fork coupled to said sleeve, said bushing being adapted to be clamped by a locking pin passing through said slot and operating as a rotary axis for changing an inclination of said saddle, said central body defining, at a region overlying said open slot, two slanted portions, wherein said open bushing comprises, at a top portion thereof, jaw elements having an inclination corresponding to that of said two slanted portions of said central body.

2. An improved saddle, according to claim 1, wherein said central body defines, at a front portion thereof, a coupling tip and, at a rear portion thereof, two strut elements, which can be coupled to said bicycle saddle.

3. An improved saddle, according to claim 1, wherein said jaw elements define slanted opposite planes, corresponding to inclined planes defined on said central body.

4. An improved saddle, according to claim 1, said locking pin engaging with said arms of said fork arranged at an end portion of said sleeve, wherein said locking pin cooperates with said jaw elements and said inclined portions of said central body to clamp and lock said bushing on said central body.

* * * * *